United States Patent
Voss

(10) Patent No.: US 6,670,009 B1
(45) Date of Patent: Dec. 30, 2003

(54) MULTI-LAYER EXTENDED TEXT RESEALABLE LABEL

(75) Inventor: David J. Voss, Omaha, NE (US)

(73) Assignee: Industrial Label Corporation, Omaha, NE (US)

( * ) Notice: Subject to any disclaimer, the term of this patent is extended or adjusted under 35 U.S.C. 154(b) by 0 days.

(21) Appl. No.: 10/319,194

(22) Filed: Dec. 13, 2002

(51) Int. Cl.[7] .................................................. B32B 7/06
(52) U.S. Cl. .................... 428/40.1; 283/81; 283/94; 283/101; 428/41.8; 428/42.1; 428/42.2; 428/42.3; 428/192; 428/194; 428/354; 428/914
(58) Field of Search ................. 428/40.1, 41.8, 428/42.1, 42.2, 42.3, 192, 194, 201, 202, 354, 914; 283/81, 94, 101

(56) References Cited

U.S. PATENT DOCUMENTS 5,238,720 A * 8/1993 Volkman ................... 428/40
5,904,973 A    5/1999 Coward et al. .............. 428/198

* cited by examiner

*Primary Examiner*—Nasser Ahmad
(74) *Attorney, Agent, or Firm*—Thomte, Mazour & Niebergall; Dennis L. Thomte

(57) ABSTRACT

A multi-layer extended text resealable label comprising a first base layer and a second layer selectively secured thereto. The label is constructed in such a way so that when the second layer is completely separated from the first layer, the second layer is devoid of any adhesive material thereon so that the second layer may be conveniently handled without the same sticking to other materials. The second layer is also resealable onto the first layer.

3 Claims, 2 Drawing Sheets

MULTI-LAYER EXTENDED TEXT RESEALABLE LABEL

BACKGROUND OF THE INVENTION

1. Field of the Invention

This invention relates to a resealable label and more particularly to a multi-layer extended text resealable label.

2. Description of the Related Art

One-ply labels have been used on consumer products sold in bottles, jars or other containers for many years. Ordinarily, the one-ply labels work very well on those products where all the pertinent or required labeling information is able to be printed on the exposed side of the label. However, many consumer products such as insecticides, herbicides, etc., require extensive labeling information or text which cannot be printed on a one-ply label. Hence, multi-layer extended text labels have been provided to enable the required information or text to be printed on at least a pair of label plys or layers.

In U.S. Pat. No. 5,904,973, a multi-layer extended text label is disclosed. The '973 label includes a first base layer having one side which is adhesively secured to the product container. A major portion of the other side of the first base layer is coated with a layer of release material except for one small region or anchor area. A second layer is provided which has a portion of its underside coated with a pressure sensitive adhesive which is "permanently" attached to the base layer in the one region or anchor area thereof that is not coated with release material and which is temporarily attached to the base layer in the major portion thereof that is coated with release material. The second layer of the '973 label is adapted to be lifted and pulled back from the base layer until the anchor area is reached.

Although multi-layer text labels such as disclosed in the '973 patent function satisfactorily in many situations, they pose problems in other situations. For instance, it is sometimes desirable to completely remove the second layer from the base layer. In some cases, the second layer may be used as a coupon for a refund or discount. In other cases, the second layer may comprise a recipe or the like. The fact that the second layer is coated with adhesive on its underside makes the handling of the same difficult since the separated second layer will tend to adhesively adhere to other objects or surfaces.

SUMMARY OF THE INVENTION

A multi-layer extended text resealable label is disclosed comprising a first base layer having first and second sides and a second layer which is selectively positioned on the first layer and which has an outer side and an inner side. The first side of the first layer is coated with a pressure sensitive adhesive for attachment to a selected product. The second side of the first layer also has a pressure sensitive adhesive applied thereto. The inner side of the second layer is coated with a layer of release material except for at least one region or anchor area thereof that is not coated with the release material. The said one region is temporarily secured to the second side of the first base layer. The second layer may be peeled back from adhesive engagement with the first layer until the said one region or anchor area is reached. The second layer is completely removable from the first base layer upon said at least one region being separated from said first base layer. The second layer, upon being peeled back from adhesive engagement with the first layer until said one region or anchor area is reached, is resealable onto the first layer. The second layer, upon being pulled back with respect to the first layer and being completely separated from the first base layer, is devoid of any adhesive material thereon. The first and second layers have matching corners. It is preferred that the second side of the first layer at one its corners has a small area devoid of adhesive to facilitate the peeling back of the second layer with respect to the first layer.

A principal object of the invention is to provide an improved multi-layer extended text resealable label.

A further object of the invention is to provide a multi-layer extended text resealable label comprising a first base layer which is attached to a selected product and a second layer which is selectively positioned on the first layer in such a way so that when the second layer is completely removed from the first layer, the second layer is devoid of any adhesive material thereon.

A further object of the invention is to provide a multi-layer extended text resealable label including a removable label portion which is devoid of any adhesive so that it will not stick to other objects or surfaces upon being removed from the product.

These and other objects will be obvious to those skilled in the art.

DESCRIPTION OF THE PREFERRED EMBODIMENT

Figure 1:
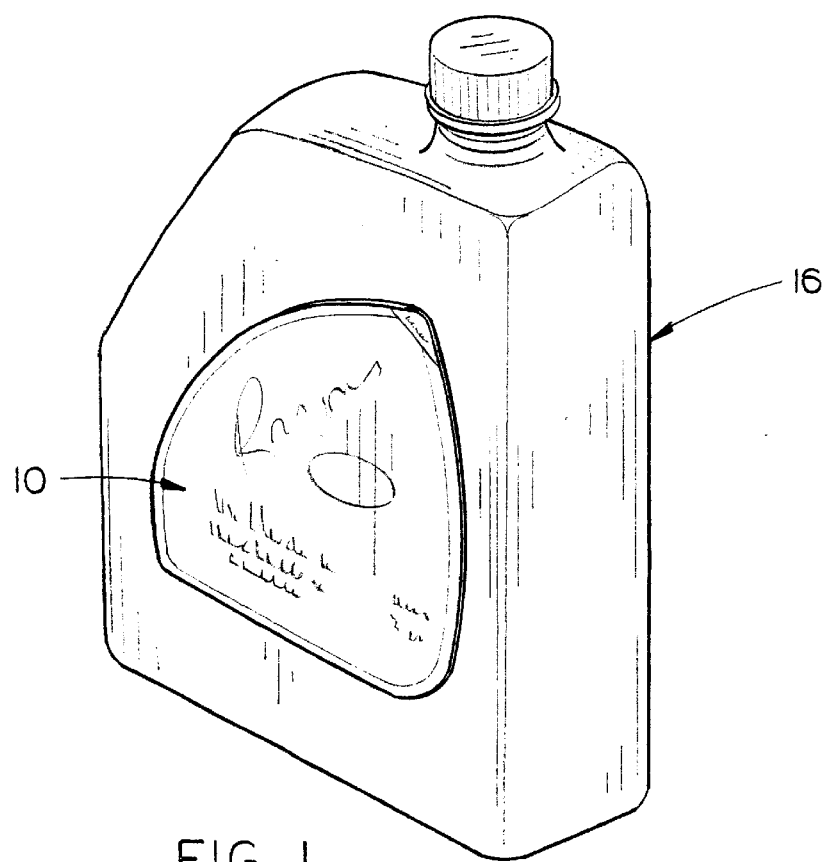
FIG. 1 is a perspective view of a product container having the label of this invention applied thereto.
Figure 2:
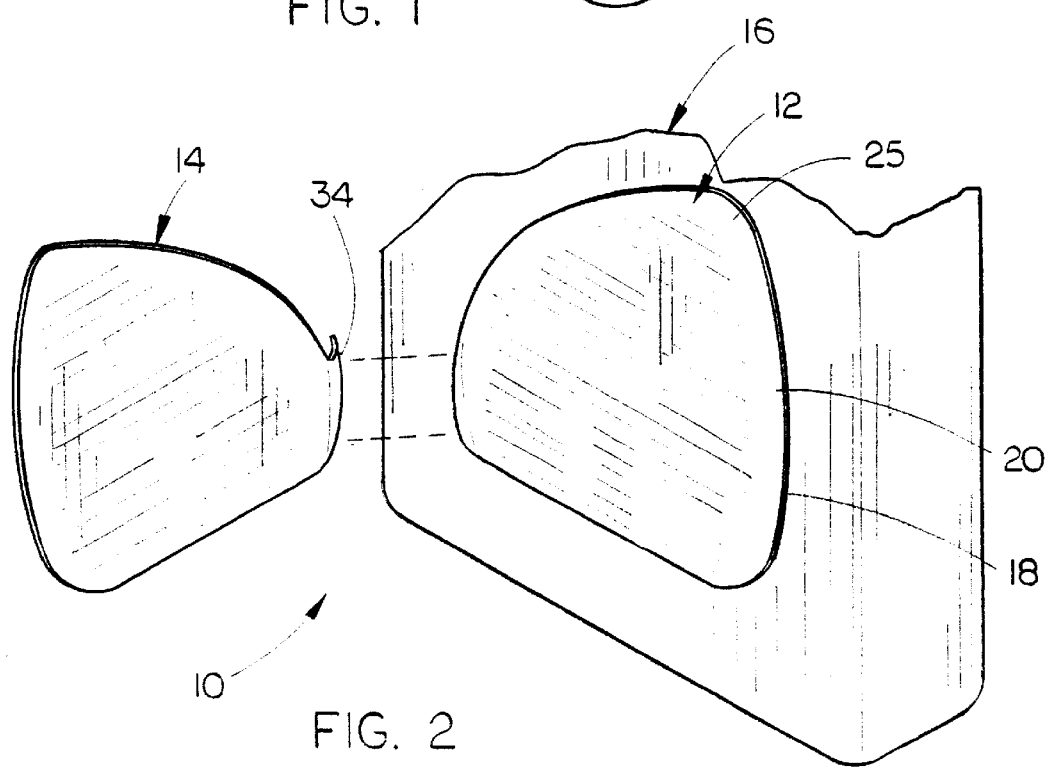
FIG. 2 is a perspective view illustrating the second layer of the label having been removed from the first layer of the label.
Figure 3:
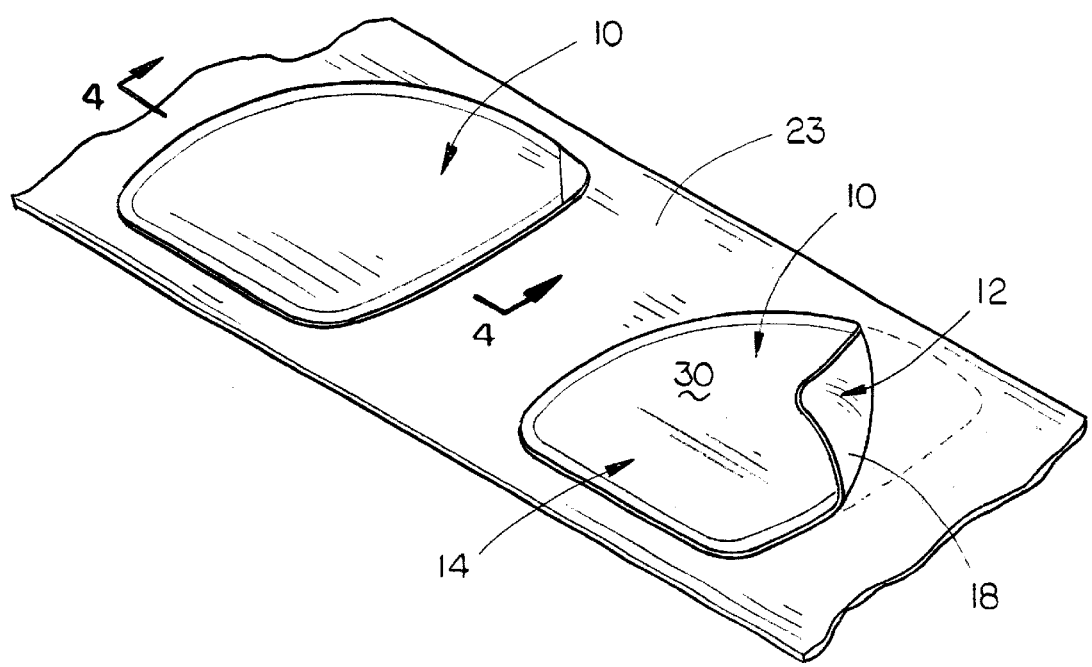
FIG. 3 is a perspective view illustrating the manner in which labels of this invention are temporarily applied to a plastic carrier sheet.
Figure 4:
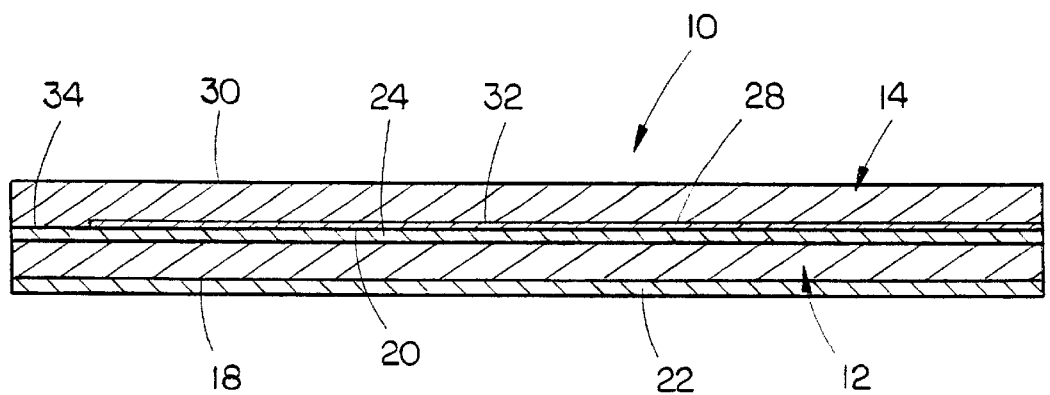
FIG. 4 is an enlarged sectional view of the label as seen on lines 4—4 of FIG. 3.

The label of this invention is referred to generally by the reference number 10 and will normally be comprised of a first base layer 12 and a second layer 14. Label 10 is ideally suited for use on a container such as a bottle, bag, box, jar, etc., where extended text or information is necessary or desirable. For illustration purposes, a bottle 16 is shown upon which the label 10 may be used. Layer 10 will normally be constructed of a conventional material such as paper or plastic. For purposes of description, layer 12 will be described as including a first side 18 and a second side 20. First side 18 of layer 12 is coated, either completely or patterned, with a conventional pressure sensitive adhesive material 22 to facilitate the attachment of first layer 12 of label 10 to the container which in this case is shown to be the bottle 16. The pressure sensitive adhesive material 22 also allows the label 10 to be mounted on a conventional carrier strip or sheet 23 during manufacture for shipment to the location where the labels are attached to the product (FIG. 3).

The second side 20 of first layer 12 is coated, either completely or patterned, with a conventional pressure sensitive adhesive material 24. In most cases, it is preferred that a small area 25 at the upper right corner of second side 20 be free of the adhesive material 24 to facilitate the peeling of the second layer 14 from the first layer 12 as will be described in more detail hereinafter.

Second layer 14 of label 10 is also constructed of a conventional material such as paper or plastic and will be described as including an inner side 28 and an outer side 30. Inner side 28 of layer 14 is coated with a conventional release material 32 such as silicone or the like except for one region or anchor area 34 thereof which is preferably positioned along the left side of the layer 14. Anchor area 34 temporarily secures the layer 14 to the layer 12.

Ordinarily, second side 20 of layer 12 will have printed information or text appearing thereon. Inner side 28 and outer side 30 of layer 14 will also normally have printed information or text appearing thereon. With respect to layer 12, the printed text appearing on second side 20 will be printed thereon prior to the adhesive material 24 being applied thereto. The printed information or text on inner side 28 of layer 14 will normally be printed thereon prior to the release material being applied thereto.

When the purchaser of the product within the bottle 16 desires to read the printed extended text or information printed on side 20 of layer 12 and/or the printed extended text or information printed on side 28 of layer 14, the customer peels back the layer 14 from the layer 12 by grasping the upper right corner of layer 14 and pulling the same to the left. The silicone release material 32 permits the separation or "peeling back" of layer 14 with respect to layer 12 until the anchor area 34 is reached which yieldably resists further separation of layer 14 with respect to layer 12. After the customer has read the text printed on side 20 of layer 12 and/or the text printed on side 28 of layer 14, the customer may reseal the layer 14 onto the layer 12 in conventional fashion. If the customer wishes to completely remove the layer 14 from the layer 12 rather than resealing layer 14 onto layer 12, the customer exerts additional peeling or separating force to the layer 14 to separate the layer 14 from layer 12 at the anchor area 34.

When the layer 14 has been completely removed from layer 12, layer 14 is devoid of any adhesive material thereon which enables the customer to file the layer 14 in a card file or the like for future reference without the layer 14 sticking to the file or other materials in the file. In some cases, the layer 14 will serve as a coupon for future purchases or rebates and the absence of adhesive thereon enables convenient handling of the layer 14 (coupon) without the layer 14 sticking to other coupons, surfaces or objects.

Thus, it can be seen that the invention accomplishes at least all of its stated objectives.

I claim:

1. A multi-layer extended text resealable label comprising:
   a first base layer having first and second sides;
   said first side of said first base layer being coated with a pressure sensitive adhesive for attachment to a selected product;
   said second side of said first base layer having a pressure sensitive adhesive applied thereto;
   a second layer selectively positioned on said first layer and having an outer side and an inner side;
   said inner side of said second layer being coated with a layer of release material except for at least one region thereof that is not coated with release material;
   said at least one region being temporarily secured to said second side of said first base layer;
   said second layer being able to be peeled back from adhesive engagement with said first layer until said at least one region is reached;
   said second layer being completely removable from said first base layer upon said at least one region being separated from said first base layer;
   said second layer, upon being pulled back with respect to said first base layer and being completely separated from said first base layer being devoid of any adhesive material thereon.

2. The label of claim 1 wherein said second layer, upon being peeled back from adhesive engagement with said first layer until said at least one region is reached, is resealable onto said first layer.

3. The label of claim 1 wherein said first layer and said second layer have matching corners and wherein said second side of said first layer at one of its corners has a small area devoid of adhesive to facilitate the peeling back of said second layer with respect to said first layer.

* * * * *